Patented Jan. 18, 1944

2,339,314

UNITED STATES PATENT OFFICE 2,339,314

RESINOUS CONDENSATION PRODUCTS OF ALDEHYDES AND COMPOUNDS OF THE PYRROLE AND THIAZOLE SERIES

Werner Zerweck and Max Schubert, Frankfort-on-the-Main-Fechenheim, Germany; vested in the Alien Property Custodian No Drawing. Application January 18, 1940, Serial No. 314,449. In Germany January 27, 1939

5 Claims. (Cl. 260—72)

Our present invention relates to resinous condensation products more particularly to those obtained by condensing aldehydes, such as aliphatic aldehydes of a low molecular weight, particularly with formaldehyde, or with agents setting free such aldehydes, with a member of the group consisting of compounds of the pyrrole and and thiazole series having two double bonds and, attached to the ring members, at least one hydrogen atom and a member of the group consisting of a hydrogen atom and a group which can be condensed with aldehydes, but at the most two methine groups (CH) and one amino group.

The reaction may be carried out with or without the addition of a diluent. Generally the addition of an acid agent accelerates, that of an alkaline acting agent retards the condensation reaction. According to the reactivity of the component to be condensed one may regulate the course of reaction to the desired degree by means of the addition either of acid or alkaline acting agents.

The condensation may be carried out in several steps and the soluble alkylol compound may be isolated.

Moreover, other compounds which can be condensed with aldehydes such as urea and its derivatives, such as thiourea, N-substituted ureas, guanidine, dicyandiamide, amines of six- and five-membered heterocyclic ring systems, such as melamine, diamino-pyrimidine, phenyl-guanazole or the corresponding hydrazine compounds, sulphonamides, mono- and polycarboxylic acid amides, anilines, phenols and the like may be added to the reaction components so that it is possible to vary the properties of the reaction products in different directions. The present condensation products are resinous products mostly like the phenol-formaldehyde condensation products and are thermo-setting, infusible and insoluble in all the usual solvents, and exhibit considerable mechanical strength and chemical resistance.

Compared with the phenol-formaldehyde condensation products they are distinguished by a particular resistance to boiling water and acids and alkalies, a fact which is perhaps due to the absence of free hydroxyl groups, which are present in the molecule of the phenol-formaldehyde condensation products.

The new products of the present invention may be applied for the manufacture of plastic masses, moulding masses, adhesive and glueing agents, lacquers, films and other artificial products.

Moreover, it is possible to mix the present resinous condensation products with other natural and artificial resins such as phenol, urea, aminotriazine, aniline, alkyd or ketone resins.

The following examples illustrate the invention, the parts being by weight.

Example 1

A mixture of 10 parts of 2.4-dimethylpyrrole of the formula:

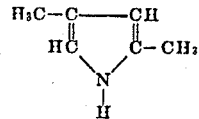

50 parts of a formaldehyde solution of 30% strength and 50 parts of alcohol is heated under reflux for a short time and the clear solution is evaporated to dryness. The reaction product is a dark and opaque resin which is insoluble in water and organic solvents.

Example 2

To a solution of 5 parts of 2.4-dimethyl-3-ethylpyrrole of the formula:

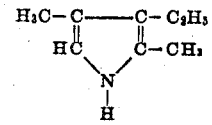

(cf. H. Fischer, Ber., vol. 56, page 612), in about 25 parts of alcohol, 25 parts of a formaldehyde solution of 30% strength and 1 part of concentrated hydrochloric acid are added and the mixture is evaporated on the water-bath to dryness. In this manner a dark and opaque resin is obtained which is hardened by long heating at 90 to 100° C. or a shorter heating at 120 to 130° C.

Example 3

10 parts of a trimethylpyrrole mixture, obtained by acting with methyl iodide on potassium 2.4-dimethylpyrrole, are dissolved in about 50 parts of alcohol, 50 parts of a formaldehyde solution of 30% strength are added and the mixture is heated for a short time on the water-bath under reflux. The dark red solution is evaporated at 90 to 100° C. and then heated for some hours at 120 to 130° C. The reaction product is a hard and dark resin.

*Example 4*

10 parts of 2-aminothiazole of the formula:

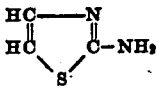

(cf. Traumann, Liebigs, Annalen, vol. 249, page 36) are dissolved in about 50 parts of alcohol; 20 parts of benzaldehyde and 1.5 parts of concentrated hydrochloric acid are added and the mixture is heated for a short time on the water-bath under reflux. After evaporation to dryness the resin formed is heated at 120 to 130° C. until it becomes hard.

When replacing benzaldehyde by 50 parts of a formaldehyde solution of 30% strength a resin of similar properties is obtained.

*Example 5*

10 parts of 4-methyl-2-aminothiazole of the formula:

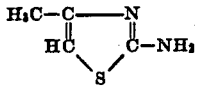

are dissolved in 50 parts of a slightly warmed formaldehyde solution of 30% strength. After addition of 4 parts of concentrated hydrochloric acid the clear reddish solution is evaporated to dryness and the dark residue is heated to 120 to 130° C. for hardening. In this manner a dark and hard resin is obtained which is resistant to water and benzene and particularly suitable for the manufacture of adhesive and glueing agents.

*Example 6*

10 parts of 4-methyl-2-aminothiazole are dissolved in 50 parts of a warmed formaldehyde solution of 30% strength. To this solution while stirring slowly at 90 to 100° C. a mixture of 40 parts of butanol and 20 parts of toluene is added. When the water has been removed by an azeotropic distillation, a clear viscous solution of the reaction product in butanol is obtained. On pouring such a resin solution on a glass or metallic support, after drying a transparent water-repellent coating is obtained, which by standing for a long time or by warming at elevated temperatures can be hardened and is in this state resistant to water, benzene and alcohol.

*Example 7*

To a hot solution of 10 parts of 4-phenyl-2-aminothiazole of the formula:

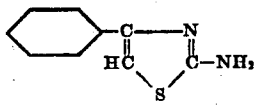

50 parts of a formaldehyde solution of 30% strength and 2 parts of formic acid are added and the mixture is evaporated to dryness. The residue is heated for a short time at 130 to 140° C. for hardening. A yellowish resin is obtained, which is insoluble in water and organic solvents.

By replacing the 4-phenyl-2-aminothiazole by the same amount of 4-methyl-2-phenylaminothiazole of the formula:

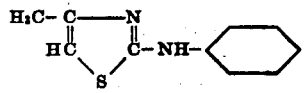

a similar resin likewise of good properties is obtained.

*Example 8*

10 parts of 2-mercapto-4-hydroxythiazole of the formula:

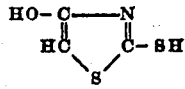

(cf. Journ. f. prakt. Chem., vol. 16, page 1) are dissolved in about 50 parts of a formaldehyde solution of 30% strength while warming on the water-bath. After the addition of 2 parts of formic acid the clear orange solution is evaporated to dryness. The residue is shortly heated at 120 to 130° C. In this manner a clear orange resin, which is insoluble in water, benzene and alcohol, is obtained.

*Example 9*

The solution of 30 parts of 2-amino-4-methylthiazole (cf. Examples 5 and 6) in about 20 parts of a formaldehyde solution of 40% strength is evaporated to dryness at 90 to 100° C. The residue is heated for some hours at 120 to 130° C. In this manner there is obtained a slightly colored resin which is very resistant to water and insoluble in benzene and alcohol.

*Example 10*

The solution of 2-amino-4-methylthiazole in a formaldehyde solution as obtained according to the foregoing example is shortly warmed until after cooling to room temperature a viscous solution is formed to which 5 parts of a hydrochloric acid of about 20% strength are added.

By coating, for instance, a beech veneer sheet of 2 mms. thickness on both sides with the aforesaid solution, covering each side with a further beech veneer sheet of the same thickness but not coated with solution, in such a way that the woody fibers of the exterior sheets are running in a direction which is right-angled to that of the fibers of the interior sheet, and by bringing this layer of sheets into a veneering press which has been heated previously to about 100° C. and pressing the sheets for about 10 minutes under a pressure of 10 to 20 atmospheres, a ply-wood sheet is obtained which is resistant to water even when boiled therein for some hours.

*Example 11*

100 parts of an alkyd resin obtained by heating at 240° C. for about 6 hours a mixture of 280 parts of 9.11-octadiene acid, 125 parts of glycerine and 225 parts of phthalic acid anhydride are dissolved in about 60 parts of toluene. To the solution there are added 160 parts of a solution of 50% strength in butanol or isobutanol of a condensation product obtained by condensing, according to Example 6, 2-amino-4-methylthiazole and butanol or isobutanol with formaldehyde. The lacquer thus formed may be dried during about 1 hour at 175–180° C. and yields coat-layers, which are very resistant to motor oils and boiling water.

Example 12

100 parts of an alkyd resin, obtained according to the process as described in British specification No. 316,914 by acting with phthalic acid anhydride on a mixture of linseed oil fatty acid monoglyceride and glycerol, are dissolved in about 100 parts of toluene and 140 parts of a solution of 50% strength of a 2-amino-4-methyl-thiazolebutanol - (isobutanol) - formaldehyde condensation product are added. After having been dried at 180° C. the mixture is a coat-layer resistant to motor oils.

Example 13

100 parts of an alkyd resin, obtained by heating a mixture of aliphatic carboxylic acids obtained by saponifying palm oil with glycerine and phthalic acid anhydride, are dissolved in about 100 parts of toluene and 200 parts of the thiazole formaldehyde resin solution as used in Examples 11 and 12 are added. The lacquer may be dried by heating at 200° C. for half an hour and is then particularly elastic and resistant to motor oils, boiling water and dilute alkalies.

Example 14

10 parts of 2-amino-4-methylthiazole are dissolved in 27 parts of a formaldehyde solution of 30% strength, then 40 parts of n-butanol are added and the solution is heated until distillation begins. Then 20 parts of toluene are added and by azeotropic distillation about 20 parts of water are removed, 1 part of phthalic acid anhydride is added and the distillation is continued until no more water passes over. A clear viscous butanolic solution of the reaction product is obtained. When pouring such a resin solution on a glass or metal surface after drying a transparent, water repelling coat is obtained which can be hardened by standing for a longer time or warming at higher temperatures. Then it is resistant to water, benzene and alcohol.

When replacing n-butanol by the same quantity of isobutanol a lacquer solution of similar properties is obtained.

We claim:

1. Resinous condensation products obtained by condensing an aldehyde with a five-membered heterocyclic ring compound selected from the group consisting of 2-aminothiazole, 4-methyl-2-aminothiazole, 4-phenyl-2-aminothiazole, 4-methyl-2-phenylamino-thiazole and 2-mercapto-4-hydroxythiazole, which resinous products are thermo-setting, infusible and insoluble in all the usual solvents and exhibit considerable mechanical strength and chemical resistance.

2. Resinous condensation products obtained by condensing a formaldehyde with a five-membered heterocyclic ring compound selected from the group consisting of 2-aminothiazole, 4-methyl-2-aminothiazole, 4-phenyl-2-aminothiazole, 4-methyl-2-phenylaminothiazole and 2-mercapto-4-hydroxythiazole, which resinous products are thermo-setting, infusible and insoluble in all the usual solvents and exhibit considerable mechanical strength and chemical resistance.

3. A resinous condensation product obtained by condensing 2-aminothiazole of the formula:

with formaldehyde, which condensation product is a dark resin, which is thermo-setting and insoluble in water and organic solvents.

4. A resinous condensation product obtained by condensing 4-methyl-2-aminothiazole of the formula:

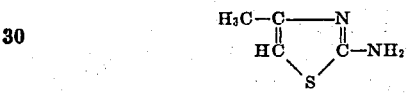

with formaldehyde, which condensation product is a dark and hard resin, which is resistant to water and benzene and particularly suitable for the manufacture of adhesive and glueing agents.

5. A resinous condensation product obtained by condensing 4-methyl-2-aminothiazole of the formula:

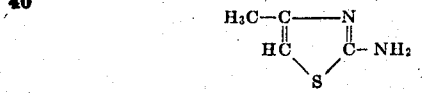

and butanol with formaldehyde, which condensation product yields a transparent coat resistant to water, benzene and alcohol.

WERNER ZERWECK.
MAX SCHUBERT.